United States Patent [19]

Poon et al.

[11] Patent Number: 5,633,791
[45] Date of Patent: May 27, 1997

[54] DOUBLE MODULATION CONVERTER

[76] Inventors: Franki N. K. Poon, Flat 17, 12/F, Chung Yew Building, No. 75, Kok Cheung Street, Tai Kok Tsui, Kowloon, Hong Kong; Bryan M. H. Pong, Room 1616, Block D, Kornhill, Quarry Bay, Hong Kong

[21] Appl. No.: 427,876

[22] Filed: Apr. 26, 1995

[51] Int. Cl.⁶ .................................................. H02H 7/122
[52] U.S. Cl. ......................... 363/56; 363/48; 363/132; 363/17
[58] Field of Search .......................... 363/17, 56, 41, 363/98, 132, 136

[56] References Cited

U.S. PATENT DOCUMENTS

| 5,229,930 | 7/1993 | Makimaa | 363/132 |
| 5,245,520 | 9/1993 | Imbertson | 363/17 |
| 5,402,329 | 3/1995 | Wittenbreder, Jr. | 363/16 |

*Primary Examiner*—Robert Nappi
*Assistant Examiner*—Shawn Riley
*Attorney, Agent, or Firm*—Robert E. Malm

[57] ABSTRACT

The double modulation converter (DMC) is a DC-AC converter for driving an AC-DC converter. It has two input terminals for connection to a DC voltage source, two output terminals for connection to an AC-DC converter, and a plurality of circuit control terminals for receiving a plurality of control waveforms which cause a bipolar stream of width- and amplitude-modulated pulses to appear at the output terminals when a load is connected across the output terminals. The basic elements of the DMC are two switches connected in series across the input terminals. One output line connects an output terminal to the junction of the two switches. The other output line connects the other output terminal to one of the input terminals. During operation, the two switches periodically and alternately open and close, the closure of one switch causing a pulse of one polarity to appear across the output terminals, and the closure of the other switch causing a pulse of opposite polarity to appear across the output terminals. A switch is closed only when a near-zero voltage exists across the switch. In order to bring about this result, a diode and capacitor are connected in parallel with each switch and an inductor is placed in output line. When one switch opens, the other switch closes only when there is less than 0.7 volts across the switch. The time period during which the voltage across the switch to be closed is less than 0.7 volts is a function of the resonant frequency of the capacitance associated with the switch to be closed and the inductance associated with the output lines and the load to which the output lines are connected. One or more capacitors are placed in one of the output lines to block DC. The resonant frequency of the output-line capacitors and inductor is at least a factor of two less than the switching frequency.

6 Claims, 2 Drawing Sheets

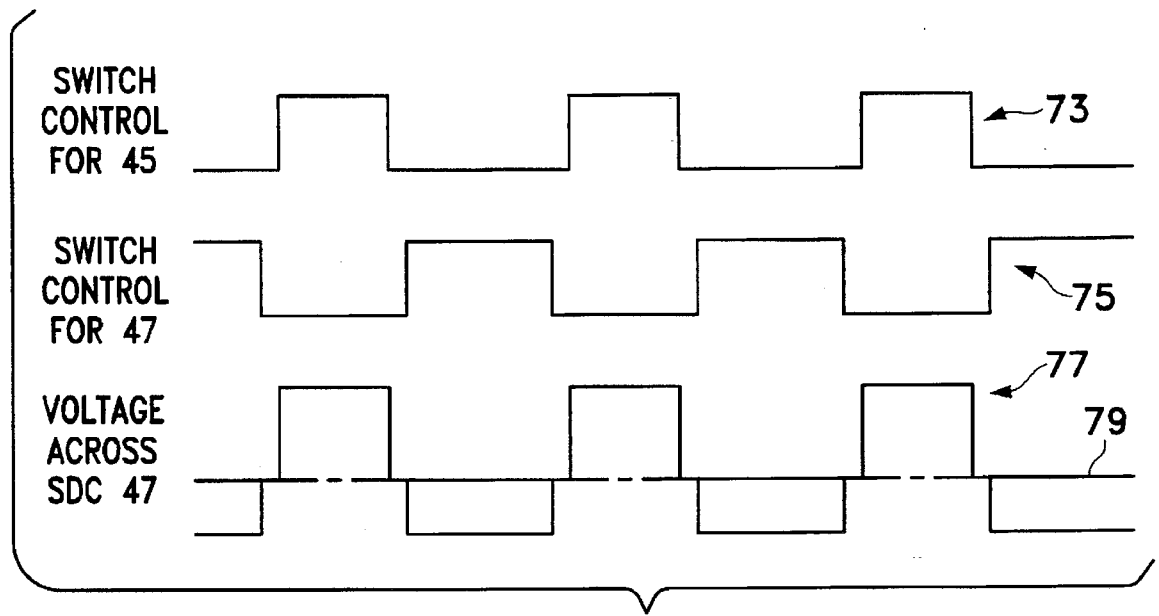
FIG. 6
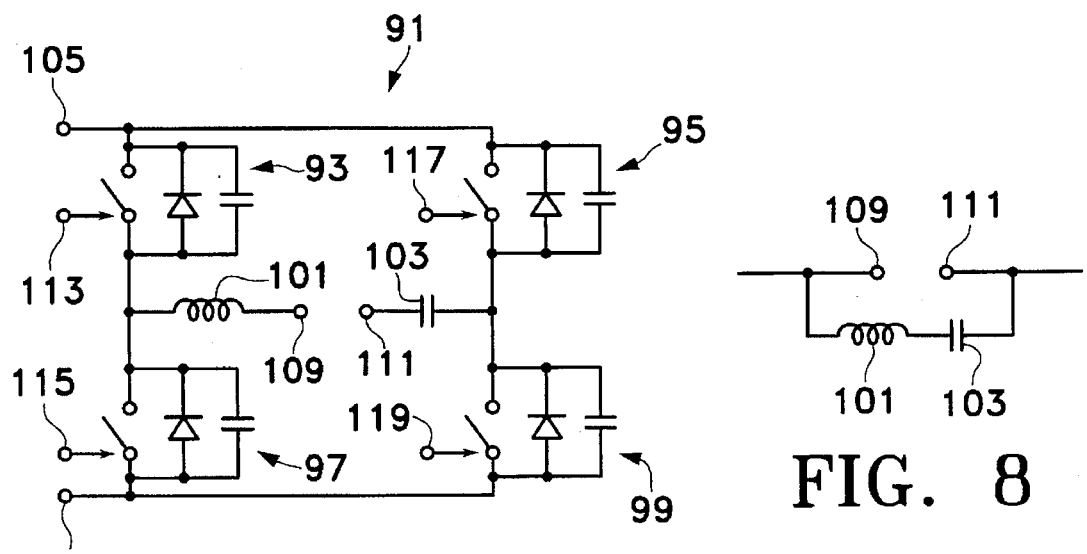
FIG. 7
FIG. 8

DOUBLE MODULATION CONVERTER

BACKGROUND OF THE INVENTION

This invention relates generally to DC-AC power converters and more specifically to DC-AC converters which serve as drivers of AC-DC converters.

There are two popular approaches to the design of DC-AC converters, both of which convert a DC source voltage into an AC output by switching power semiconductor switches on and off at a high frequency. These approaches provide the means for achieving small, light-weight, and highly-efficient converter drivers.

One approach is to generate a stream of pulses and to control the output voltage by controlling the width of the pulses. This pulse-width modulation (PWM) approach results in square-wave voltage waveforms across the switches and switching losses that increase with switching frequency. The switching losses tend to be high, and the electromagnetic interference (EMI) that accompanies the process is also high and difficult to control by filtering.

A second approach to DC-AC conversion is to add capacitor-inductor resonating elements to the PWM configurations in order to obtain sinusoidal voltage and/or current waveforms. These resonant converters have lower switching losses, thereby permitting operation at higher switching frequencies. The EMI generated by resonant converters is lower, and the higher switching frequencies result in reductions in size, weight, and cost. However, resonant switching means that the semiconductor switches are subjected to greater stress, and switches designed for greater stress also have larger "on" resistances which tends to increase switching losses. Many resonant converters operate with varying switching frequencies which means the generated EMI is harder to predict and control.

There is a need for DC-AC converters that combine the simplicity of PWM converters with the performance advantages of resonant converters.

BRIEF SUMMARY OF THE INVENTION

The double modulation converter (DMC) is a DC-AC converter for driving an AC-DC converter. It comprises two input terminals for connection to a DC voltage source, two output terminals for connection to an AC-DC converter, and a plurality of circuit control terminals for receiving a plurality of control waveforms which cause a bipolar stream of width- and amplitude-modulated pulses to appear at the output terminals when a load is connected across the output terminals.

The simplest embodiment of the DMC comprises first and second switches connected in series across the input terminals, each switch having first and second switch terminals and a control terminal. The output terminals connect by output lines to the first and second switch terminals of the second switch. The switch control terminals connect to the circuit control terminals.

During operation the first and second switches periodically and alternately open and close, the closure of the first switch causing a pulse having a first width, a certain polarity, and a first amplitude to be generated, and the closure of the second switch causing a pulse having a second width, opposite polarity, and a second amplitude to be generated. The first and second amplitudes and the first and second widths are typically different in magnitude.

The control waveform appearing on the first circuit control terminal causes the first switch to periodically close for a first time period, and the control waveform appearing on the second circuit control terminal causes the second switch to periodically close for a second time period, only one of the switches being closed at any given time. The first and second time periods are typically different in magnitude. A predetermined third time period separates the closing of the first switch and the opening of the second switch and a predetermined fourth time period separates the closing of the second switch and the opening of the first switch.

A switch is closed only when a voltage less than 0.7 volts exists across the switch. The inherent capacitance of the switch and the inherent inductance of the output lines may be sufficient to bring about this result. In order to extend the time period for bringing about this result, a diode and capacitor can be connected in parallel with each switch and/or an inductor can be placed in an output line. When one switch opens, the other switch closes only when there is less than 0.7 volts across the switch. The time period during which the voltage across the switch to be closed is less than 0.7 volts is a function of the resonant frequency of the capacitance associated with the switch to be closed and the inductance associated with the output lines and the load to which the output lines are connected. One or more capacitors are placed in one of the output lines to block DC. The resonant frequency of the output-line capacitors and inductor is at least a factor of two less than the switching frequency.

A second embodiment of the DMC is essentially two of the two-switch embodiments operating in concert. The junction of the two switches in one of the two-switch embodiments connects to one output line and the junction of the two switches in the other of the two-switch embodiments connects to the other output line.

BRIEF DESCRIPTION OF THE DRAWINGS

FIG. 6 shows typical control waveforms for controlling the operation of the double modulation converter and the output waveform that results from the use of these control waveforms.

FIG. 7 is the circuit diagram for the third preferred embodiment of the double modulation converter.

FIG. 8 shows an alternative output structure for the double modulation converter of FIG. 7.

DESCRIPTION OF THE PREFERRED EMBODIMENTS

Figure 1:
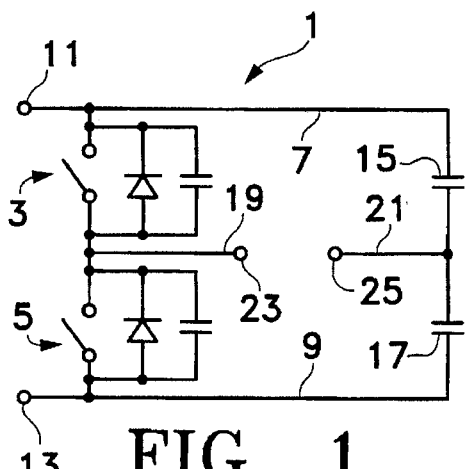
FIG. 1 is the circuit diagram of a prior-art PWM converter.

The double-modulation converter is most conveniently described in the context of the prior art half-bridge PWM converter 1 shown in FIG. 1. The PWM converter 1 consists of two switch-diode-capacitor combinations 3 and 5 connected in series to input lines 7 and 9 which connect at terminals 11 and 13 to a DC voltage source. In the material that follows, a "switch-diode-capacitor combination" will referred to as an "SDC".

A voltage-dividing circuit consisting of capacitors 15 and 17 also connects to the input lines 7 and 9. The output lines 19 and 21 connect through terminals 23 and 25 to an interface circuit that is part of an AC-DC converter. The interface circuit is typically a transformer although other types of interface circuit are also used.

Figure 2:
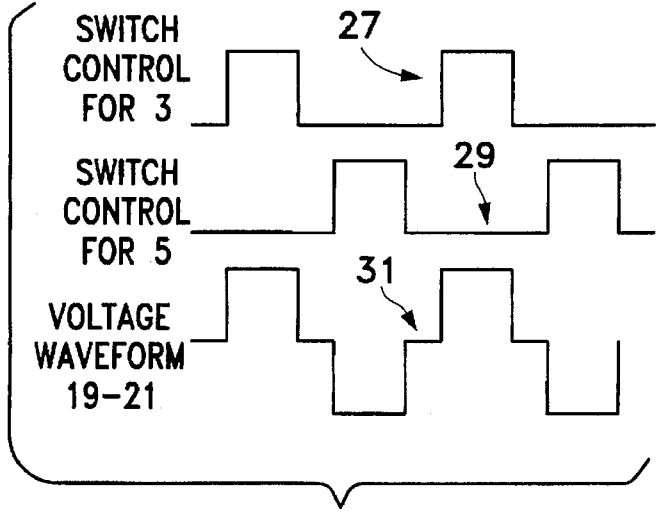
FIG. 2 shows typical control waveforms for controlling the operation of a prior-art PWM converter and the output waveform that results from the use of these control waveforms.

The switches in SDCs 3 and 5 are controlled respectively by the control waveforms 27 and 29 shown in FIG. 2. The switches are closed when the control waveforms are high and open when the waveforms are low. The waveform 29 is identical to waveform 27 except that it is delayed by half a period. The frequency of the control waveforms 27 and 29 is fixed, but the duty cycle, i.e. the ratio of the switch closure time to the period can be varied from 0 to 0.5. The duty cycle determines the magnitude of the voltage transferred through the interface circuit to the AC-DC converter.

Assuming the voltage at terminal 11 is positive and that at terminal 13 negative and of the same magnitude, the voltage waveform 31 that appears across the output lines 19 and 21 is a bipolar stream of pulses of constant amplitude that can be modulated in width by varying the duty cycle.

Figure 3:
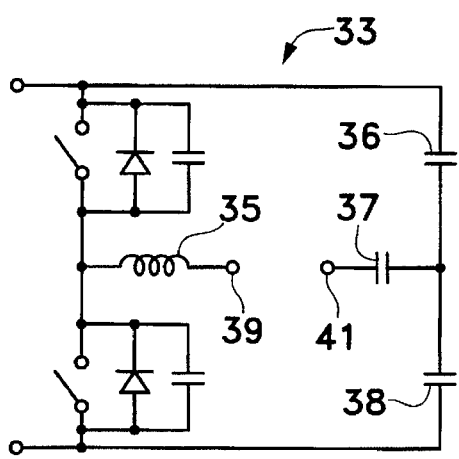
FIG. 3 is the circuit diagram of a prior-art resonant converter and also the circuit diagram of the first embodiment of the double modulation converter.

A prior art half-bridge resonant converter 33 is obtained by inserting in the output lines 19 and 21 of the PWM converter 1 the inductor 35 and the capacitor 37, as shown in FIG. 3. The addition of these resonating elements results in sinusoidally varying voltage and/or current waveforms accompanied by reduced switching losses and switch stresses. Switch closures in resonant converters are also governed by control waveforms having the symmetries of the waveforms 27 and 29 shown in FIG. 2, and the voltage waveform that appears across the output terminals 39 and 41 is a smoothed version of waveform 31, just as one would anticipate as a result of driving a resonant circuit with a square wave. To obtain the desired operation, the ratio of the switching frequency to the resonant frequency of the inductor 35 and capacitor 37 (together with any other inductive or capacitive components in the output lines) must be in the approximate range of 0.5 to 2. The magnitude of the AC voltage that is transferred to the AC-DC converter by means of the interface circuit can be controlled either by pulse width modulation (like the PWM converter) or by varying the switching frequency. In either case, the output waveform is characterized by equal bipolar excursions.

The double modulation converter (DMC) has the same circuit configuration as the resonant converter shown in FIG. 3, but the operation is completely different. The switch control waveforms are interlaced and have different duty cycles. The time periods during which both switches are open is typically small compared to the period of the control waveforms. And finally, the capacitor 37 performs the function of blocking DC, and thus, the resonant frequency of the inductive and capacitive elements in the output lines should be less than the switching frequency by at least a factor of two and preferably by a factor of five or more. The result of these constraints on the design is an output voltage that is a double-modulated stream of pulses in which alternate pulses have different widths and different amplitudes.

There are a number of preferred embodiments of the DMC. The first embodiment 33 is shown in FIG. 3 wherein the capacitors 36, 37, and 38 together accomplish DC blocking. DC blocking is necessary in order that the inductor 35 not be driven into saturation as a result of the unbalanced drive that is characteristic of the DMC. To effectively perform the function of DC blocking, the resonant frequency of capacitors 36, 37, and 38 and inductor 35 must be at least a factor of two less than the switching frequency.

Figure 4:
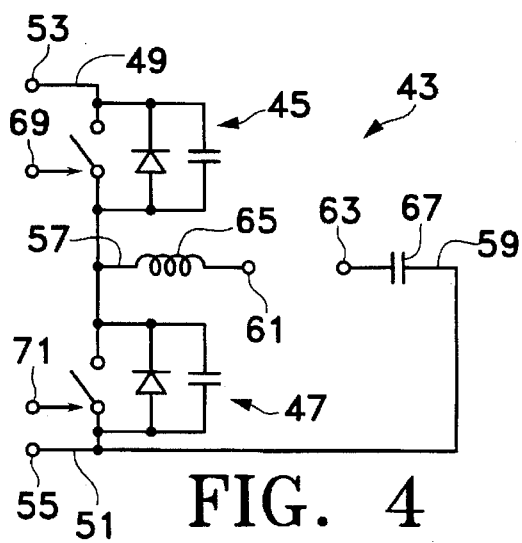
FIG. 4 is the circuit diagram for the second preferred embodiment of the double modulation converter.
Figure 5:
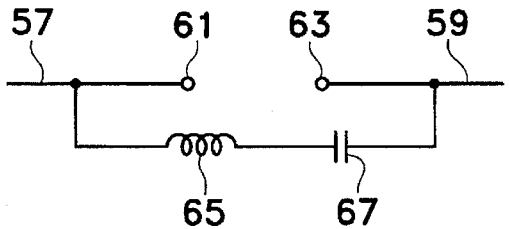
FIG. 5 shows an alternative output structure for the double modulation converter of FIG. 4.

The second preferred embodiment is shown in FIG. 4. The SDCs 45 and 47 are connected in series across the input lines 49 and 51 which connect to a DC voltage source at terminals 53 and 55. Output line 57 connects the junction of SDCs 45 and 47 to the output terminal 61, and output line 59 connects the input line 51 to the output terminal 63. The inductor 65, shown inserted in output line 57 in FIG. 4, can be inserted in either output line 57 or 59. The capacitor 67, shown inserted in output line 59 in FIG. 4, can also be inserted in either output line 57 or 59. The inductor 65 and the capacitor 67 can also be connected in series and connected across the two output lines 57 and 59 as shown in FIG. 5.

The DMC drives a load connected across output terminals 61 and 63. The inductive and capacitive components of the anticipated load must be taken into account in choosing the appropriate values of inductance and capacitance for the inductor 65 and capacitor 67 respectively.

The operation of the DMC is controlled by switch control waveforms which are introduced at terminals 69 and 71 and control the states of the switches in SDCs 45 and 47. A high value of a control waveform causes the associated switch to be closed while a low value causes the switch to be open.

A typical set of switch control waveforms 73 and 75 for controlling the switches in SDCs 45 and 47 respectively are shown in FIG. 6 and illustrates one of the most significant differences between the DMC and other converters. The duty cycle of switch control waveform 73 can be different than that of switch control waveform 75, where the duty cycle is the fraction of the pulse repetition period during which the waveform is high. The duty cycle of the waveform controlling the switch in SDC 45 (FIG. 4) may be either less than, equal to, or greater than the duty cycle of the waveform controlling the switch in SDC 47.

It should be noted that the high periods of waveforms 73 and 75 in FIG. 6 are interlaced in such a way that there is a "dead" time when both waveforms are low at the beginning and end of each high period. The dead time corresponds to both switches in SDCs 45 and 47 being open. In the preferred embodiments of the DMC, the dead time is small compared to the period of the waveforms.

The DMC of FIG. 4 operates as follows when a DC voltage is applied across terminals 53 and 55 (terminal 53 being the positive terminal), a load is connected across terminals 61 and 63, and control waveforms generically described in FIG. 6 are applied to terminals 69 and 71. When the switch in SDC 45 closes, current flows through inductor 65, the load, and capacitor 67. It should be recognized that the function of capacitor 67 is to block DC thereby preventing inductor 65 from being driven into saturation. Consequently, the resonant frequency of inductor 65 and capacitor 67 should be less than the switching frequency by at least a factor of two and ideally by a factor of five or more. Thus, under steady-state conditions, the voltage across capacitor 67 does not change appreciably during the operation of the DMC.

When the SDC 45 switch opens, inductor 65 tries to maintain the current, the SDC 45 capacitor is charged, and the SDC 47 capacitor is first discharged and then recharged with opposite polarity until the SDC 47 diode becomes forward-biased. When the SDC 47 diode becomes forward-biased, it conducts current, and limits the voltage across the SDC 47 switch to approximately 0.7 volts, assuming the diode is a silicon device.

The dead time between the opening of the SDC 45 switch and the closing of the SDC 47 switch is made long enough for the SDC 47 diode to become forward-biased but not so long that the SDC 47 diode becomes reverse-biased again (as a result of the recharging of the SDC 47 capacitor) and no longer limits the voltage across the SDC 47 switch. Thus, the SDC 47 switch is caused to close when the voltage across the switch is near zero (i.e. no greater than 0.7 volts) thereby minimizing the loss that occurs when the SDC 47 switch is closed.

The time required for an SDC diode to become forward-biased after the switch in the other SDC is opened is a function of the resonant frequency of the sum of the capacitances associated with the switches and the inductance associated with the output lines. The capacitance associated with a switch is the sum of the capacitance of the switch, the capacitance of any capacitors that are bridged across the switch terminals, and any stray capacitance that arises, for example, from conductors connecting to the switch terminals. The inductance associated with the output lines is the sum of the inductance of any inductors in the output lines, the inductance of the output lines, and the inductance of the load. The time required for the current through the inductors in the output lines to reach zero after the SDC diode first becomes forward-biased is also a function of the resonant frequency of the sum of the capacitances associated with the switches and the inductance associated with the output lines.

When the SDC 47 switch closes, with capacitor 67 acting as the electromotive force in the circuit, the current through inductor 65 soon reverses. The closure of the SDC 47 switch also causes the SDC 45 capacitor to charge to the input line voltage. When the SDC 47 switch is opened again, the current flowing through inductor 65 charges the SDC 47 capacitor, discharges the SDC 45 capacitor, and then recharges the SDC 45 capacitor with opposite polarity. The recharging of the SDC 45 capacitor forward-biases the SDC 45 diode, thereby limiting the voltage across the SDC 45 switch to approximately 0.7 volts. The dead time is chosen such that the SDC 45 switch closes during the period when the voltage across the switch is near zero, as in the case of the SDC 47 switch.

The process just described then repeats. The output voltage at terminals 61 and 63 can be varied by varying the duty cycle of each of the control waveforms 73 and 75 (FIG. 6) while keeping the dead time constant. The rectified and filtered output voltage from a transformer-coupled AC-DC converter is proportional to the expression $D(1-D-D_d)$ where D is the duty cycle of the control waveform having the smallest duty cycle and $D_d$ is the dead time duty cycle (i.e. the ratio of the sum of two successive dead times to the period of the control waveform).

The waveform 77 shown in FIG. 6 is a typical example of the voltage which appears across SDC 47. The effect of blocking the DC shifts the zero-voltage reference to the average value of the waveform, represented by the line 79 in FIG. 6. The waveform 77, with respect to the zero-voltage reference 79, consists of a bipolar stream of pulses wherein the amplitudes and widths of alternate pulses are typically different. In other words, DMC produces an output stream of pulses wherein typically both the pulse width and the pulse amplitude are modulated. This characteristic is the reason for calling the invention a double modulation converter.

The SDC 45 and SDC 47 capacitor values should be as small as possible. Since all electronic switching devices have stray capacitance, the provision of an actual capacitor connected across the switch terminals may be unnecessary. It may also be possible to omit inductor 65 and use in its place the inductance possessed by the load and/or other devices connected to or inserted in the output lines 57 and 59. Even the copper traces on a printed circuit board that correspond to the output lines 57 and 59 may be adequate equivalents of the inductor 65.

Instead of using a single capacitor 67 for DC blocking, as shown in FIG. 4, a two-capacitor arrangement derived from FIG. 3 can be used. The capacitor 37 is omitted and the capacitors 36 and 38 together perform the DC blocking function.

A prototype of the DMC embodiment 33 shown in FIG. 3 has been constructed utilizing the following components:

SDC switches: TO-220 package MOSFETs (without heat sinks)

SDC capacitors: 100 pF (MOSFET drain-to-source capacitance)

SDC diodes: MOSFET body diodes inductor 65: 13 µH capacitors 81, 83: 0.022 µF load: transformer-coupled full-wave rectifier (16/6 transformer turn ratio).

For an input voltage of 140 V and a switching frequency of 1 Mhz, the output voltage ranged from about 4 to 20 volts as the duty cycle ranged from 0.1 to 0.4. For an output voltage of 20 V and an output current of 2.5 A, the temperature rise of the MOSFETs was 35° C. For a MOSFET thermal resistance of 62.5° C/W, the calculated total loss in each MOSFET was 0.56 W. The conduction resistance of each MOSFET was 1.5Ω and the conduction loss was 0.45 W. A comparison of the total loss and the conduction loss indicates that the switching loss was only 0.11 W which is very much less than that of conventional converter configurations for which the switching loss is usually a few times that of the conduction loss. The input current waveform was non-pulsating which is indicative of low EMI since there are no sharp rising or falling edges of current.

A third preferred embodiment 91 of the DMC is shown in FIG. 7. The embodiment 91 is essentially two of the embodiments 43 (FIG. 4) operating in concert. The SDCs 93 and 95 are the equivalents of SDC 45 in FIG. 4. The SDCs 97 and 99 are the equivalents of SDC 47 in FIG. 4. Inductor 101 and capacitor 103 correspond to inductor 65 and capacitor 67 respectively in FIG. 4.

Input terminals 105 and 107 are connected to a DC voltage source and correspond to input terminals 53 and 55 in FIG. 4. Output terminals 109 and 111 are connected to a load and correspond to output terminals 61 and 63 in FIG. 4. Control terminals 113, 115, 117, and 119 provide the means for introducing switch control waveforms into the SDCs.

DMC embodiment 91 utilizes waveform 73 (FIG. 6) to control the states of the switches in SDCs 93 and 99 and waveform 75 to control the states of the switches in SDCs 95 and 97. Thus, the switches of SDC 93 and SDC 99 open and close simultaneously, and the switches of SDC 95 and SDC 97 open and close simultaneously, the switches of SDCs 95 and 97 being open when the switches of SDCs 93 and 99 are closed and vice versa.

When the SDC 93 switch and the SDC 99 switch close, current flows from the positive terminal 105 through the SDC 93 switch, inductor 101, a load connected between output terminals 109 and 111, capacitor 103, and through the SDC 99 switch to the negative terminal 107.

When the SDC 93 switch and the SDC 99 switch open, inductor 101 tries to maintain the current flow, thereby charging the SDC 93 and SDC 99 capacitors and discharging and recharging with opposite polarity the SDC 95 and SDC 97 capacitors. The SDC 95 and the SDC 97 diodes become forward-biased and limit the voltages across the SDC 95 and SDC 97 switches to approximately 0.7 volts. The SDC 95 and SDC 97 switches then close while the voltages across the switches are near-zero (i.e. less than 0.7 volts). With the voltage applied through the SDC 95 and SDC 97 switches now reversed in polarity, the current flow through capacitor 103, inductor 101, and the load soon reverses direction and continues to flow in the reverse direction until the SDC 95 and SDC 97 switches open.

When the SDC 95 and SDC 97 switches open, with inductor 101 providing the electromotive force, the SDC 95 and SDC 97 capacitors are charged and the SDC 93 and SDC 99 capacitors are first discharged and then begin to recharge with opposite polarity. The resulting forward-biasing of the SDC 93 and SDC 99 diodes limits the voltage across the SDC 93 and SDC 99 switches and capacitors to approximately 0.7 volts. The SDC 93 and SDC 99 switches close while the voltages across the switches are near-zero (i.e. less than 0.7 volts). The electromotive force, now being supplied by the DC supply through terminals 105 and 107, again reverses and flows in the original direction through inductor 101, the load, and capacitor 103.

The process just described then repeats. As in the case of DMC embodiment 43 shown in FIG. 4, the output voltage at terminals 109 and 111 can be varied by varying the duty cycle of each of the control waveforms 73 and 75 (FIG. 6) while keeping the dead time constant.

DMC embodiment 91 can also be operated (1) with the SDC 93 and SCD 97 switches controlled by the generic waveforms 73 and 75 shown in FIG. 6 and with one of the SDC 95 and SDC 99 switches always closed and the other always open or (2) with the SDC 95 and SDC 99 switches controlled by the generic waveforms 73 and 75 shown in FIG. 6 and with one of the SDC 93 and SDC 97 switches always closed and the other always open.

Inductor 101 and capacitor 103, instead of being connected in series with the load (connected across terminals 109 and 111) as illustrated in FIG. 7, can be connected in parallel with the load as shown in FIG. 8.

The switches in the DMC embodiments can be any of a number of types including MOSFETs, gate turn-off thyristors (GTOs), insulated-gate bipolar transistors (IGBTs), and MOS-controlled thyristors (MCTs).

The primary advantage of the DMC over prior converters is zero-voltage switching without requiring the use of switching devices capable of surviving high electrical stress. Zero-voltage switching is desirable because it greatly reduces the switching losses of the semiconductor switches.

The losses of a switching device can be classified into three types: (1) the discharging of the stray capacitor in each turn-on cycle through the switching device; (2) the overlapping of the voltage across and the current through the switching device during the switching interval; and (3) the resistive loss in the switch while the switch is on. The DMC reduces the first two types of loss by transferring without loss the energy in the stray capacitance associated with a first switch to the stray capacitance associated with a second switch during the time period beginning with the opening of the second switch and the closing of the first switch, thereby achieving zero-voltage switching. Current conduction in the DMC is almost continuous during a cycle of operation because of a small and fixed dead time. A very simple filter can smooth the input current to a desired level with low EMI.

Zero-voltage switching has been achieved with resonant converters. However, resonant converters operate on principles very different from the DMC. Resonant converters employ the natural oscillatory nature of LC circuits to shape the voltage across a switch while the switch is open in order to create a zero-voltage condition when the switch is programmed to close. This approach calls for switches with high blocking voltage, a property which can only be achieved by increasing the "on-resistance" of the switches and accepting higher switch losses. Also, many of these converters must work on a variable frequency basis thereby making the EMI spectrum hard to predict and control.

Most zero-voltage switching techniques require a multitude of auxiliary switches and components to fulfill the zero-voltage requirement, e.g. Phase Modulation requires four switches and a very complex driving sequence circuit. This complexity discourages the use of zero-voltage switching for low-power and/or cost-sensitive applications.

The DMC achieves zero-voltage switching without the resonant converter penalties. The DMC approach does not result in excessive voltage or current stresses upon the semiconductors so that MOSFETs with low on-resistances can be used. Also, the DMC operates with a fixed switching frequency thereby making the EMI spectrum more predicable and controllable. The merit of the DMC is that it can be immediately applied to any standard half/full bridge configuration. The simple control and drive technique make it readily applicable in the industry.

What is claimed is:

1. A circuit for driving a power converter, the circuit comprising:

a first input terminal and a second input terminal for connection to a DC voltage source;

a first output terminal and a second output terminal for connection to a power converter;

a plurality of circuit control terminals for receiving a plurality of control waveforms which cause a bipolar stream of pulses to appear at the output terminals when a load is connected across the output terminals, the width and the amplitude of the pulses being modulated;

first and second switches, each switch having first and second switch terminals and a control terminal, the first switch terminal of the first switch being connected to the first input terminal, the second switch terminal of the second switch being connected to the second input terminal, the second switch terminal of the first switch being connected to the first switch terminal of the second switch;

a first output line connecting the first output terminal to the second switch terminal of the first switch;

a second output line connecting the second output terminal to the second switch terminal of the second switch;

a first circuit control terminal connected to the control terminal of the first switch;

a second circuit control terminal connected to the control terminal of the second switch;

the first and second switches periodically and alternately closing, the closure of the first switch causing a pulse having a first width and a first amplitude to appear across the output terminals, the closure of the second switch causing a pulse having a second width and a second amplitude to appear across the output terminals, the first and second widths being different in magnitude;

a capacitor and an inductor connected in series, the series combination being connected across the output lines.

2. A circuit for driving a power converter, the circuit comprising:

a first input terminal and a second input terminal for connection to a DC voltage source;

a first output terminal and a second output terminal for connection to a power converter;

a plurality of circuit control terminals for receiving a plurality of control waveforms which cause a bipolar stream of pulses to appear at the output terminals when a load is connected across the output terminals, the width and the amplitude of the pulses being modulated;

first, second, third, and fourth switches, each switch having first and second switch terminals and a control terminal, the first switch terminals of the first and third switches being connected to the first input terminal, the second switch terminals of the second and fourth switches being connected to the second input terminal, the second switch terminals of the first and third switches being connected respectively to the first switch terminals of the second and fourth switches;

a first output line connecting the first output terminal to the second switch terminal of the first switch;

a second output line connecting the second output terminal to the second switch terminal of the third switch;

first, second, third, and fourth circuit control terminals connected respectively to the control terminals of the first, second, third, and fourth switches;

the first and fourth switches closing alternately with the second and third switches, the closure of the first and fourth switches causing a pulse having a first width and a first amplitude to appear across the output terminals, the closure of the second and third switches causing a pulse having a second width and a second amplitude to appear across the output terminals, the first and second widths being different in magnitude;

a capacitor and an inductor connected in series, the series combination being connected across the output lines.

3. A circuit for driving a power converter, the circuit comprising:

a first input terminal and a second input terminal for connection to a DC voltage source;

a first output terminal and a second output terminal for connection to a power converter;

a plurality of circuit control terminals for receiving a plurality of control waveforms;

first and second switches, each switch having first and second switch terminals and a control terminal, the first switch terminal of the first switch being connected to the first input terminal, the second switch terminal of the second switch being connected to the second input terminal, the second switch terminal of the first switch being connected to the first switch terminal of the second switch;

a first output line connecting the first output terminal to the second switch terminal of the first switch;

a second output line connecting the second output terminal to the second switch terminal of the second switch;

a first circuit control terminal connected to the control terminal of the first switch;

a second circuit control terminal connected to the control terminal of the second switch, the control waveforms causing the switches to be closed periodically and alternately at a predetermined switching frequency;

at least one capacitor and at least one inductor which interact with the first and second switches via the output lines, the resonant frequency of the at least one capacitor and the at least one inductor being at least a factor of two less than the switching frequency.

4. The circuit of claim 3 further comprising:

a first diode and a first switch capacitor connected in parallel with the first switch, the first diode being reverse biased when the first switch is open and the second switch is closed;

a second diode and a second switch capacitor connected in parallel with the second switch, the second diode being reverse biased when the first switch is closed and the second switch is open.

5. A circuit for driving a power converter, the circuit comprising:

a first input terminal and a second input terminal for connection to a DC voltage source;

a first output terminal and a second output terminal for connection to a power converter;

a plurality of circuit control terminals for receiving a plurality of control waveforms;

first, second, third, and fourth switches, each switch having first and second switch terminals and a control terminal, the first switch terminals of the first and third switches being connected to the first input terminal, the second switch terminals of the second and fourth switches being connected to the second input terminal, the second switch terminals of the first and third switches being connected respectively to the first switch terminals of the second and fourth switches;

a first output line connecting the first output terminal to the second switch terminal of the first switch;

a second output line connecting the second output terminal to the second switch terminal of the third switch;

first, second, third, and fourth circuit control terminals connected respectively to the control terminals of the first, second, third, and fourth switches, the control waveforms causing at least two connected switches to be closed periodically and alternately at a predetermined switching frequency;

at least one capacitor and at least one inductor which interact with the first, second, third, and fourth switches via the output lines, the resonant frequency of the at least one capacitor and the at least one inductor being at least a factor of two less than the switching frequency.

6. The circuit of claim 5 further comprising:

a first diode and a first switch capacitor connected in parallel with the first switch, the first diode being reverse biased when the first switch is open and the second switch is closed;

a second diode and a second switch capacitor connected in parallel with the second switch, the second diode being reverse biased when the first switch is closed and the second switch is open;

a third diode and a third switch capacitor connected in parallel with the third switch, the third diode being reverse biased when the third switch is open and the fourth switch is closed;

a fourth diode and a fourth switch capacitor connected in parallel with the fourth switch, the fourth diode being reverse biased when the third switch is closed and the fourth switch is open.

* * * * *